United States Patent [19]

Whitley

[11] Patent Number: 4,531,200
[45] Date of Patent: Jul. 23, 1985

[54] INDEXED-INDIRECT ADDRESSING USING PREFIX CODES

[75] Inventor: Lawrence D. Whitley, Rochester, Minn.

[73] Assignee: International Business Machines Corporation, Armonk, N.J.

[21] Appl. No.: 446,132

[22] Filed: Dec. 2, 1982

[51] Int. Cl.³ .......................... G06F 9/22; G06F 9/00; G06F 7/00
[52] U.S. Cl. .................................................. 364/900
[58] Field of Search ... 364/200 MS File, 900 MS File

[56] References Cited

U.S. PATENT DOCUMENTS

| 3,975,623 | 8/1976 | Weinberger | 235/152 |
| 3,988,717 | 10/1976 | Kisylia | 364/200 |
| 4,363,091 | 12/1982 | Pohlman et al. | 364/200 |
| 4,399,505 | 8/1983 | Druke et al. | 364/200 |
| 4,449,184 | 5/1984 | Pohlman et al. | 364/200 |
| 4,459,666 | 7/1984 | Kruger | 364/200 |

Primary Examiner—Raulfe B. Zache
Assistant Examiner—William G. Niessen
Attorney, Agent, or Firm—J. Michael Anglin

[57] ABSTRACT

Multi-level indexed indirect addressing is provided with matched pairs of prefix bytes and suffix values which can surround any instruction. Each prefix code is distinguishable from an instruction code. Counters keep track of indirection levels.

19 Claims, 11 Drawing Figures

FIG. 1a
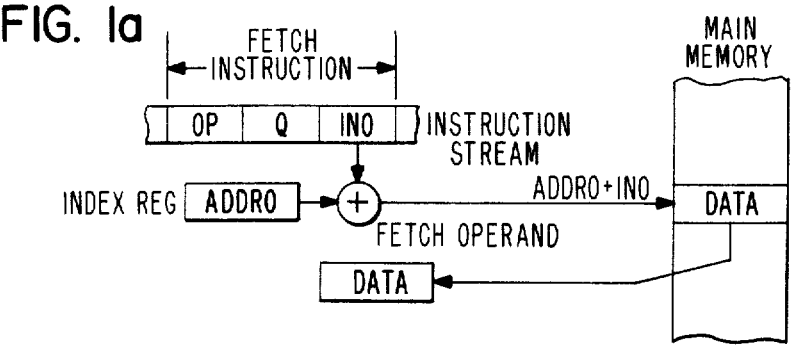
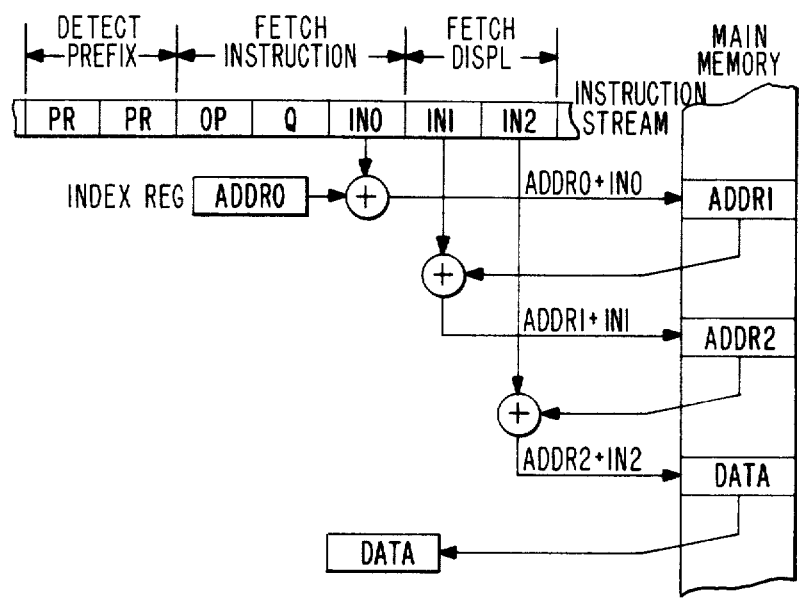
FIG. 1b

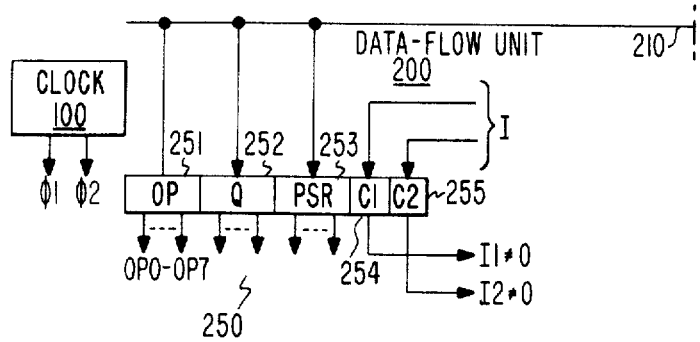
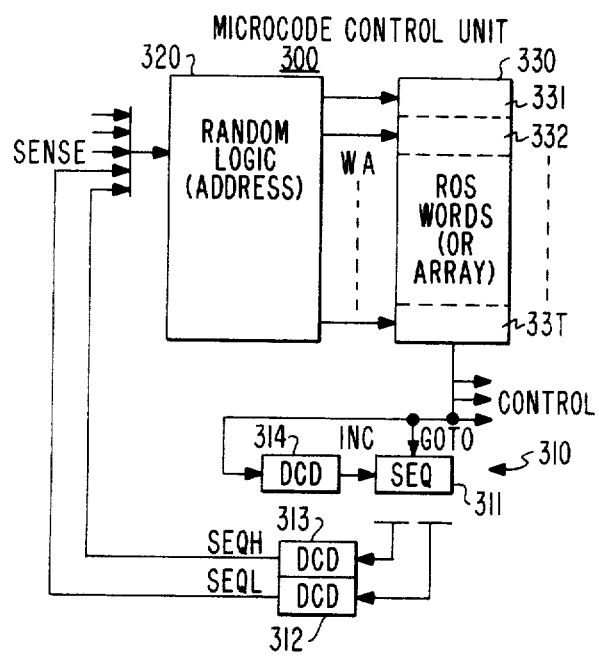
FIG. 2a
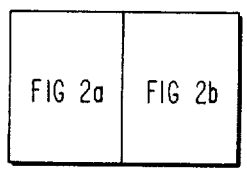
FIG. 2

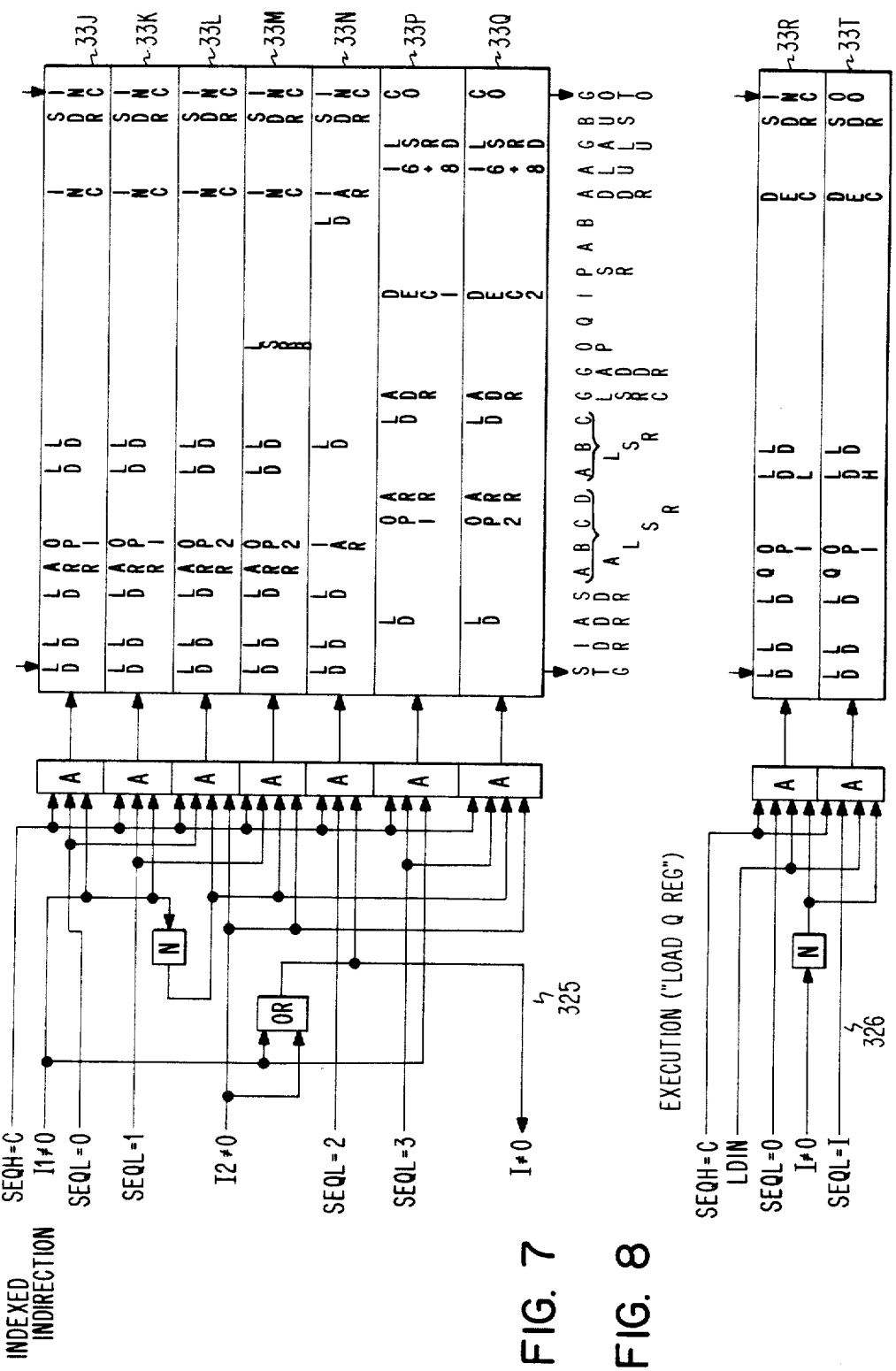

INDEXED-INDIRECT ADDRESSING USING PREFIX CODES

BACKGROUND OF THE INVENTION

The present invention pertains to electronic data processing, and more specifically concerns a new architecture for providing indexed indirect addressing of instruction operands in memory.

The addressing mode known as "indexed indirect" adds an operand address contained in an instruction to an index value to form a further address. The memory contents at this further address are treated as yet another address and added to another index value, this sum then being used to address memory for the operand. This process may be repeated any number of times for multi-level indirection, each level having its own index value.

Indexed indirect addressing is a valuable capability in an instruction set, especially in the processing of complex data structures such as lists, queues, stacks, and so forth. On the other hand, this capability does extract a penalty, an overhead which must be minimized for most efficient usage of the available bit combinations for instructions and memory addresses.

Previous approaches in this area fall into three broad types.

First, instruction operation codes can merely be duplicated to provide indirection. For example, if op-codes are one byte long, and if MOVE A,B means "move the memory contents of address A to the memory location at address B", then MOVEI A(I),B COULD mean "use the contents of address A, added to displacement value I, as the address of the operand to be moved to address B". The op-codes for MOVE AND MOVEI occupy two different bit combinations (code points) of the 256 available op-codes. Providing the other two forms of MOVE, namely A,B(I) and A(I),-B(I), requires two more code points, merely for this one instruction. Obviously, this method requires a large op-code space; or, conversely, it reduces the number of different instructions which can be accommodated in a space of a given size. Moreover, only a single level of indirection is Possible without even more extravagant use of op-code space.

Second, addressing-mode bits in each instruction, separate from the op-code, can be used to specify whether each operand in that instruction is to be direct or indirect. This method increases the total length of the instruction by at least one bit for each operand; or, by appropriating a bit which could otherwise be used in the address itself, it decreases the range of possible operand values by half. Here again, multi-level indirection is possible only at the expense of further mode bits in every instruction.

The third broad category places an indirect-mode bit in every address word in memory. When any instruction fetches an operand, it examines its mode bit. If the bit is off, that word itself is the operand; if the bit is on, the word (or its sum with an index value) is used to address memory again. This process repeats until the mode bit of an addressed word is off. While this method does permit multi-level indirection, it decreases the range of addressable memory by half. For a 16-bit memory address, only 32,768 of the possible 65,536 bit combinations represent valid addresses; the address has effectively become only 15 bits. This penalty is paid by all instructions, whether they ever use this feature or not.

SUMMARY OF THE INVENTION

The present invention provides multi-level indexed indirection for all instructions in the instruction set of a data processor, without any architectural penalty except the use of a single op-code point per operand in the instruction. That is, a one-address machine requires only one op-code point to provide indexed indirection for its entire instruction set; a two-address architecture requires a total of only two code points, and so forth.

Broadly speaking, the invention uses a special prefix code to indicate a level of indirection for a particular operand in the instruction following the code. The code also causes the processor to use a suffix byte (or other word) after that instruction as an index value to modify the indirect address. The prefix codes and index values are merely catenated to provide multiple levels of indexed indirection, each pair of prefix codes and suffix values surrounding the instruction like a matched pair of parentheses.

The architectural cost of the invention is low because, apart from the one or two fixed code points taken from the op-code space, only the actual use of indexed indirection in a particular instance incurs the extra instruction length required by the prefix code and the index value. No other instruction is affected. In fact, the present method is capable of adding indexed indirection to an instruction set not having this feature; and it is added as a true superset, without requiring any modification of the previous instructions or their format.

The implementation cost of the invention is also quite low: a counter for each different prefix code, a small amount of additional microcode, and some microcode addressing logic.

Another aspect of the invention concerns the implementation of the microcode control in the preferred embodiment. Normally, logic functions of this and other types are either totally random or is totally structured in the form of a programmed logic array (PLA), having an AND array for generating product terms and an OR array for combining those terms. It has been found, however, that overall speed can be increased without any significant degradation of reliability or even design time by designing (or converting the AND-array design of) the product terms in the form of random logic, while retaining the regular structure of a PLA OR-array for combining those terms. Such an array can be implemented as a conventional read-only memory (ROM or ROS) merely by replacing its address decoder with the random logic for generating the desired product terms.

BRIEF DESCRIPTION OF THE DRAWINGS

FIG. 1, comprising FIGS. 1A and 1B, is a logical representation of indexed indirect addressing for an instruction operand according to the present invention.

FIG. 2, comprising FIGS. 2A and 2B, is a block diagram of an existing data processor in which the invention is implemented.

FIGS. 3–8 detail the relevant portions of the control unit shown in FIG. 2.

FIG. 3 shows logic for decoding instructions.

FIG. 4 shows microcode and logic for detecting instructions and prefix codes.

FIG. 5 details microcode and logic for direct-mode operand addressing.

FIG. 6 contains microcode and logic for indexed-mode operand addressing.

FIG. 7 presents microcode and logic for indexed-indirect operand addressing, using the prefix codes detected in FIG. 4.

FIG. 8 is an example of microcode and logic for executing a particular instruction.

DESCRIPTION OF A PREFERRED EMBODIMENT

Figure 2B:
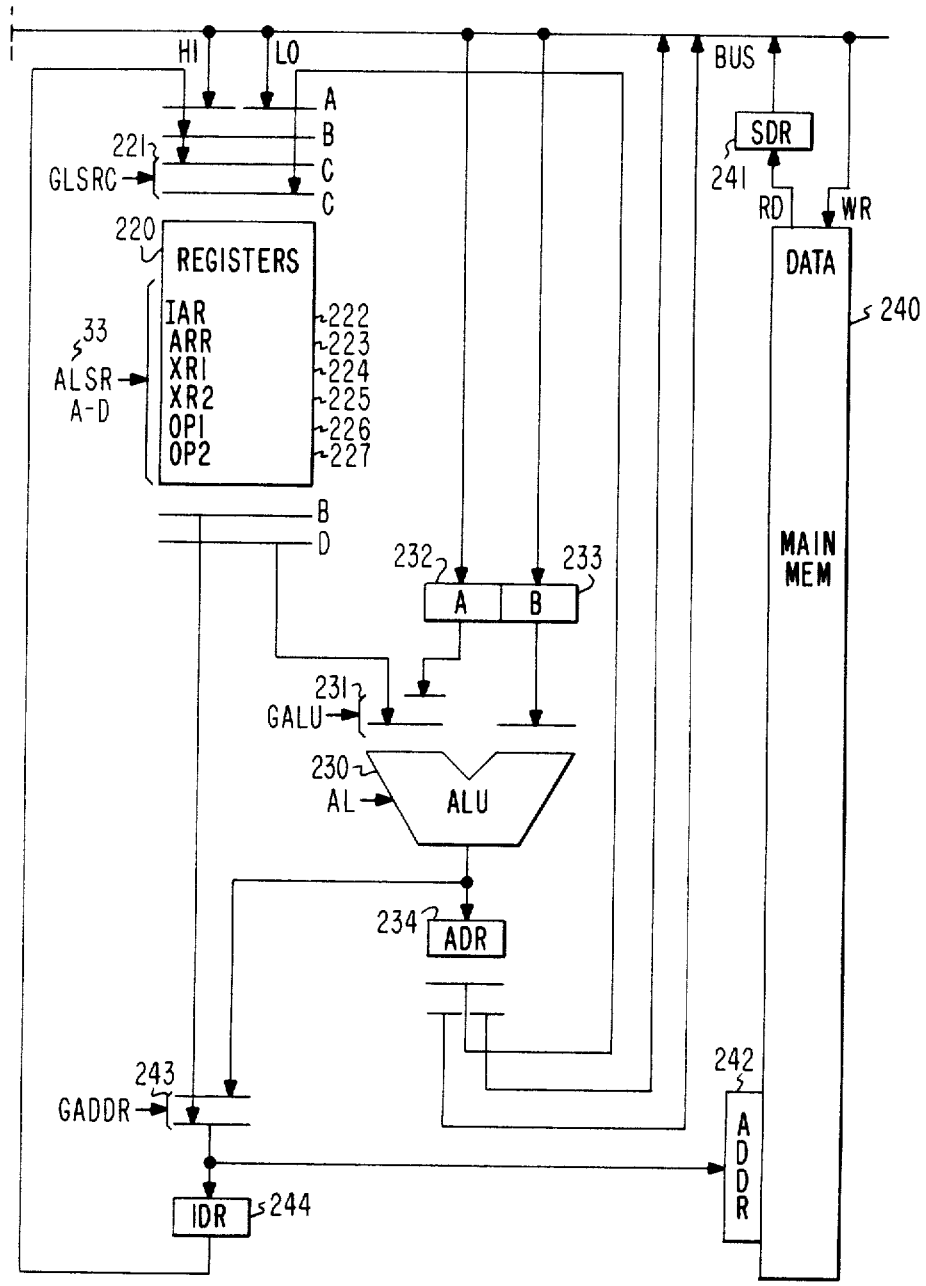

The exemplary implementation of the present invention is practiced on a general-purpose data processor similar in all relevant aspects to the publicity available IBM System/34. The instruction formats of the processor are as follows. All instructions contain an OP byte followed by a Q byte. (The Q byte performs as an operation specifier, mask byte, etc. as determined by the OP byte; it plays no part inthe present invention.) The last four bits of the OP byte (OP4-OP7) specify a generic operation type, such as "move" or "add". The first two bits (OP0-OP1) specify the mode of determining the address of a first operand to be used by the instruction:

| Bits | Action |
| --- | --- |
| 00 | Direct; two bytes following the Q byte (i.e., the third and fourth instruction bytes) are a 16-bit address of the operand in main memory. |
| 01 | Indexed; the byte following the Q byte (i.e., the third instruction byte) contains an unsigned offset or index added to a 16-bit index register XR1, the sum being the 16-bit address of the operand. |
| 10 | Indexed; identical to the previous case, except that a second index register XR2 is used. |
| 11 | Null; there is no first-operand address in the instruction. |

The next two bits (OP2-OP3) of the OP byte specify the address mode of a second operand in a similar way. This single-byte (indexed) or double-byte direct) address follows the single- or double-byte address of the first operand in the instruction. Thus, the total length of a single instruction may range from two bytes (a third "R" byte has no relevance here), if no operand addresses appear in the instruction, to six bytes, if there are two direct addresses. Any combination of null, direct, and indexed addresses is allowed.

FIG. 1A is a diagrammatic illustration of a single-address, indexed-mode instruction which does not use the present invention. An instruction stream has reached a three-byte instruction containing OP, Q, and IN0 bytes. This instruction is fetched. The operand address for the instruction is determined by adding the index byte IN0 (range 0 to 255) to the quantity ADDR0 (range 0 to 65535) in the sixteen-bit index register. The sum, ADDR0+IN0, is applied as an operand address to main memory. The addressed operand DATA is then transferred out of memory during execution of the instruction.

FIG. 1B shows the same illustrative instruction, but using the new indexed-indirect feature of the invention. When one or more prefix code bytes PR are detected in the instruction stream, their occurrences are recorded. These bytes have a bit pattern unlike that of any valid OP code byte (specifically, X'FE' or X'FF', which would specify a null set of address modes in an OP byte). The prefix bytes are independent of which particular instruction is associated with them, and hence cannot be considered parts of any specific instruction. Then, when a subsequent valid OP byte occurs in the instruction stream, it is fetched and the operand address is determined as described above for FIG. 1A. Because of the PR bytes, however, the memory contents at address ADDR0+IN0 is not interpreted as the operand itself, but rather as an address ADDR1. Also in response to the PR byte, a suffix byte IN1, following the instruction in the instruction stream, is fetched. Interpreted as an unsigned number (0 to 255), it is added to ADDR1 (0 to 65535) to modify the original operand address ADDR0+IN0 to ADDR1+IN1. The memory contents at this address would be the operand if only one PR byte had preceded the instruction containing OP,Q,IN0. The other PR byte, however, signifies another level of indirection, causing the next instruction-stream byte IN2 to be fetched. The memory contents ADDR2, addressed by ADDR1+IN1, is then interpreted as an address and added to the index value IN2 to form another modified address ADDR2+IN2. Since no further prefix bytes preceded the instruction, the memory contents DATA at ADDR2+IN2 is fetched as the operand itself. The previously fetched instruction is then executed as above. The next byte in the instruction stream, the one following IN2, will then be decoded as either an OP byte or a PR byte, and the cycle will be repeated.

Any number of indexed-indirection levels may be specified merely by surrounding the instruction with additional PR,IN byte pairs, in the manner of parentheses. The same technique serves for two-address instructions by defining a first unique prefix-byte codepoint, say PR1=X'FE' to apply to the first operand, and a second unique prefix-byte codepoint, PR2=X'FF' for the second operand. This technique may be expanded to any number n of operands in an instruction. Every instruction of any pre-existing or new n-operand instruction set of a data processor can be made multi-level indexed-indirect with only n distinct codepoints or tokens for the entire set.

The index suffixes need not assume the exact locations shown in FIG. 1B; they could conceivably follow the prefix codes directly, or could be held in separate registers. Their values obviously could be longer or shorter, signed rather than unsigned, and could even represent address modifiers other than index values. In fact, the prefix codes could be used without any address modifiers at all, merely as an indirect addressing mode. (Simple indirection is achieved in the present embodiment by setting the index value to zero.) The prefix codes need merely be some sort of token whose values can be distinguished from valid instructions and whose locations can be associated with particular instructions. For example, their length could differ from that of any particular instruction or subdivision thereof, and they need not precede the instruction they modify. Additional codepoints could be used to represent frequently occurring combinations of other prefix codes, to shorten the overall instruction length and execution time. Instead of recording prefix occurrences in a counter, a stack mechanism could hold them, and perhaps their associated suffix values as well.

FIG. 2 is a block diagram of the relevant portions of a data processor capable of supporting the invention. This processor implements the instruction set of the aforementioned IBM System/34. A conventional clock 100 produces two non-overlapping phases $\phi 1$ and $\phi 2$ for controlling the data-flow unit 200 and the microcode control unit 300. Data-flow unit 200 is organized around an eight-bit bus 210. Register bank 220 can be loaded either eight bits at a time from bus 210 or sixteen bits at a time, as indicated by the horizontal lines at the top of bank 220. Bank 220 is four-ported; i.e., each of the inputs 220A-D can operate simultaneously upon a different register in the bank, as specified by control lines ALSRA-D. Ports 220A and 220C are write-only, port 220B is read/write, and port 220D is read-only. Control line GLSRC of multiplexer 221 controls the source of data for port C. Bank 220 contains a number of individual sixteen-bit registers 222. Those relevant to the invention are:

| Name | Function |
| --- | --- |
| IAR | Instruction Address Register or program counter; contains the address of the current byte to be fetched in the instruction stream. |
| ARR | Address Recall Register; temporarily holds the contents of IAR or other registers. |
| XR1 | Index Register 1; holds an address for an operand of the current instruction, when the instruction specifies indexed mode for this operand. |
| XR2 | Index Register 2; holds a second address for indexed mode. |
| OP1 | Operand Register 1; ultimately contains the address of the first operand for the current instruction, and also holds intermediate operand addresses. |
| OP2 | Operand Register 2; contains the second operand addresses. |

Arithmetic/logic unit (ALU) 230 performs one of a number of conventional operations, as specified by control lines AL. Control lines GALU of multiplexer 231 select either a sixteen-bit input from one of the individual registers 222, or an eight-bit input from bus 210, via A-side register 232. The other input, from bus via B-side register 233, is always eight bits wide. ALU data register 234 transfers the sixteen-bit ALU output back to register bank 220 or to bus 210.

Main memory 240 receives write data from bus 210 and returns read data to bus 210 via storage data register 241. Memory address register 242 is loaded from the output of multiplexer 243. Control line GADDR loads either the contents of one of the registers 222 or the output of ALU 230. Incrementer data register 244 also receives the memory address, and may increment or decrement it before returning it to input ports B and C of register bank 220.

Instruction-register bank 250 includes specific eight-bit registers 251 and 252 coupled to bus 210 for receiving the OP and Q bytes of each instruction in the instruction stream addressed in main memory 240 via IAR in register bank 220. The individual bits OP0-OP7 are output as sense lines, as will be described. Program status register (PSR) 253 holds conventional status bits. Besides the foregoing registers, bank 250 contains two newly added prefix registers 254 and 255 for recording occurrences of the two prefix code bytes. Register 254 is implemented as a four-bit counter which can be both incremented and decremented by control lines I1. An output sense line $I1 \neq 0$ carries a signal indicating that the contents of counter 254 are nonzero. Register 255 is similarly constructed from a four-bit counter controlled by lines I2 and providing nonzero sense signal $I2 \neq 0$. This specific implementation physically allows up to fifteen levels of indirection for each of two operands. These limits could obviously be increased by providing larger counters and/or more counters.

Microcode control unit 300 is a finite-state machine for controlling data-flow unit 200. For every complete cycle of the two phases $\phi 1$, $\phi 2$ of clock 100, the signals on the input sense lines and the current state of unit 300 determine the signals on the output control lines. The sense signals come from bits OP0-OP7 of register 251, outputs $I1 \neq 0$ and $I2 \neq 0$ of registers 254 and 255, and from other sources in data-flow unit 200 not relevant to the present invention.

Next-state logic 310 manages the transition from one current state to the next. Master/slave sequencer register 311 receives an eight-bit input from lines GOTO, which form a subset of the output control lines specifying the state for the next cycle register 311 while simultaneously outputs the state for the current cycle to decoders 312 and 313, whose outputs feed back to form a subset of the sense lines. At the end of each cycle of clock 100, the next-cycle state becomes the current state, while a new next-cycle state is received on the GOTO lines. Instead of merely loading the GOTO value, sequencer 311 can be implemented as a counter, and one value (e.g., X'FF') of GOTO can be decoded at 314 to increment this counter to the next higher value. The low-order four-bit digit of the current state is translated by conventional decoder 312 to sixteen lines SEQL=0, SEQL=1, ..., SEQL=F. A second decoder 313 translates the high-order digit to another sixteen lines SEQH=0, ..., SEQH=F.

Random-logic network 320 translates the sense signals, including SEQH and SEQL, into a number of individual word-addressing signals WA for an array of read-only storage (ROS) words 330. Each word 331-33T in ROS 330 contains separate bits specifying the GOTO and control signals. Since random logic 320, unlike a conventional address decoder, permits more than one addressing signal 321 to be active simultaneously. Conventional ROS designs 330 inherently OR together the corresponding bit lines of all words in the ROS module; so the corresponding bits of all addressed words 331 are logically ORed into the output lines GOTO and CONTROL. Thus, ROS 330 becomes conceptually equivalent to the regular OR array of a programmed-logic array (PLA). Although logic network 320 performs the same overall function as the AND array of a PLA, it is implemented quite differently, as will be more fully described hereinafter. The design of logic 320 as a random network rather than as a structured array frequently results in a higher overall speed and in a smaller overall size.

FIGS. 3–8 show in detail those parts of control unit 300 which are relevant to the addressing of operands. The required sense inputs to logic 320 are the bits OP0-OP7 from register 251, the nonzero-status signals $I1 \neq 0$ and $I2 \neq 0$ from counters 254 and 255, the current-state signals SEQL=0,1,2,3,6,7 from decoder 312, and the current-state signals SEQH=O,C from decoder 313. The relevant control signals emitted from ROS 330 are as follows:

| Name | Function |
|---|---|
| STG | Load data from bus 210 into main memory 240. |
| IDR | Load register 244. |
| ADR | Load register 234. |
| SDR | Load register 241. |
| ALSRA-D | Transfer data to or from the specified registers 222-227 via port A-D, respectively. |
| LSRA-C | Connect the specified data inputs to write-ports A-C respectively. |
| GLSR | Controls multiplexer 221 of write-port C. |
| GADDR | Controls multiplexer 243. |
| OP | Load register 251. |
| Q | Load register 252. |
| I | Increment or decrement the specified C1, C2 counter 254 or 255. |
| PSR | Load program status register 253. |
| A | Load register 232. |
| B | Load register 233. |
| ADDR | Load register 242. |
| AL | Specifies the arithmetic or logical operation to be performed by ALU 230. (In FIGS. 4-8, the notation "16+8" in this field signifies the addition of a sixteen-bit operand on the left side to an unsigned eight-bit operand on the right side of ALU 230.) |
| GALU | Controls multiplexer 231. |
| BUS | Couples the specified register for transmission of data to bus 210. |
| GOTO | Eight bits specifying the current state of next-state logic 310 for the next clock cycle. (The upper digit 0-F in each word entry represents SEQH; the lower digit represents SEQL.) |

Figure 3:
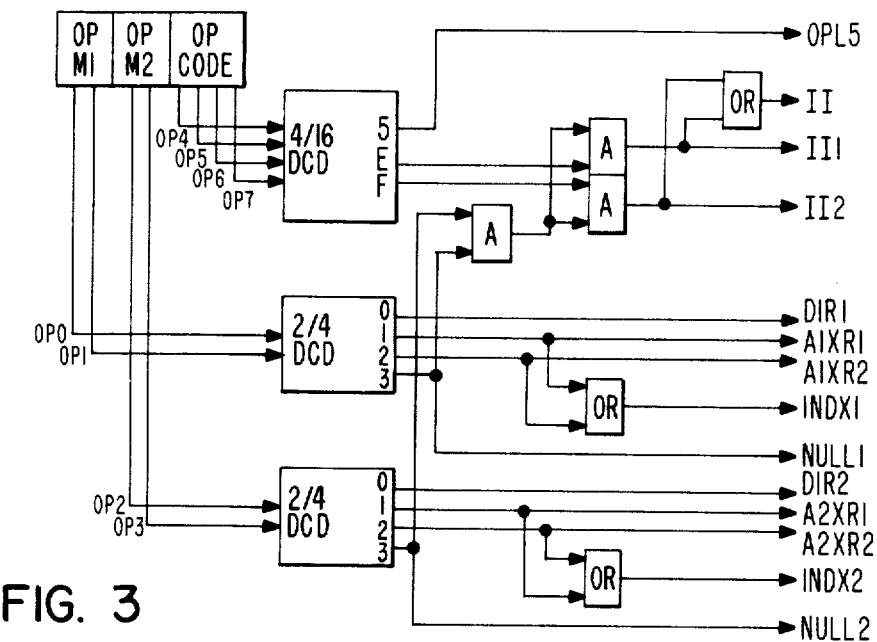

FIG. 3 details instruction-decoding logic 321 of network 320 for producing signals used by the logic of FIGS. 4-8. Lines OP4-OP7 from OP register 251 are decoded by a conventional four-to-sixteen-line decoder. The X '5' output becomes a "load instruction" signal OPL5. Whenever OP0-OP1=X '3' AND OP-2-OP3=X '3', the X 'E' output of this decoder raises signal III to detect the first-operand prefix byte. The X 'F' output raises II2 to detect the second-operand prefix under the same condition. That is, the binary bit pattern of the first prefix byte is OP0-OP7=X 'FE', while the second prefix byte is OP0-OP7=X'FF'. The II signal detects the occurrence of either prefix byte.

Lines OP0-OP1 are decoded by a two-to-four line decoder to produce address-mode signals for the first operand. OP0-OP1=0 indicates a direct address, DIR1, as mentioned previously. The '1' and '2' outputs A1XR1 and A1XR2 indicate indexed modes using one or the other of the index registers; the INDX1 signal is raised for either of these modes. NULL1 is raised for OP0-OP1=3; this output indicates lack of a first operand, except when OP4-7=E or F. A second two-to-four-line decoder converts OP2-OP3 into corresponding address-mode signals for the second operand in the same manner.

FIGS. 4-8 show the relevant random logics 320 and ROS words 330 in greater detail. The following notation is used in the ROS words. The legend below each figure represents the control lines described in connection with FIG. 2. The vertical column above each control line represents the action of the bit combination for each ROS word. For example, the INC notation in the right most column of word 331, FIG. 4, indicates that the GOTO control lines assume a state (e.g. X'FF') capable of incrementing sequencer 311, FIG. 2, as previously described, whenever word 311 is enabled by logic 322. Blank entries in the columns specify that no action is taken or that the action is not relevant to the invention (i.e., the actual entry is a "don't-care").

Figure 4:
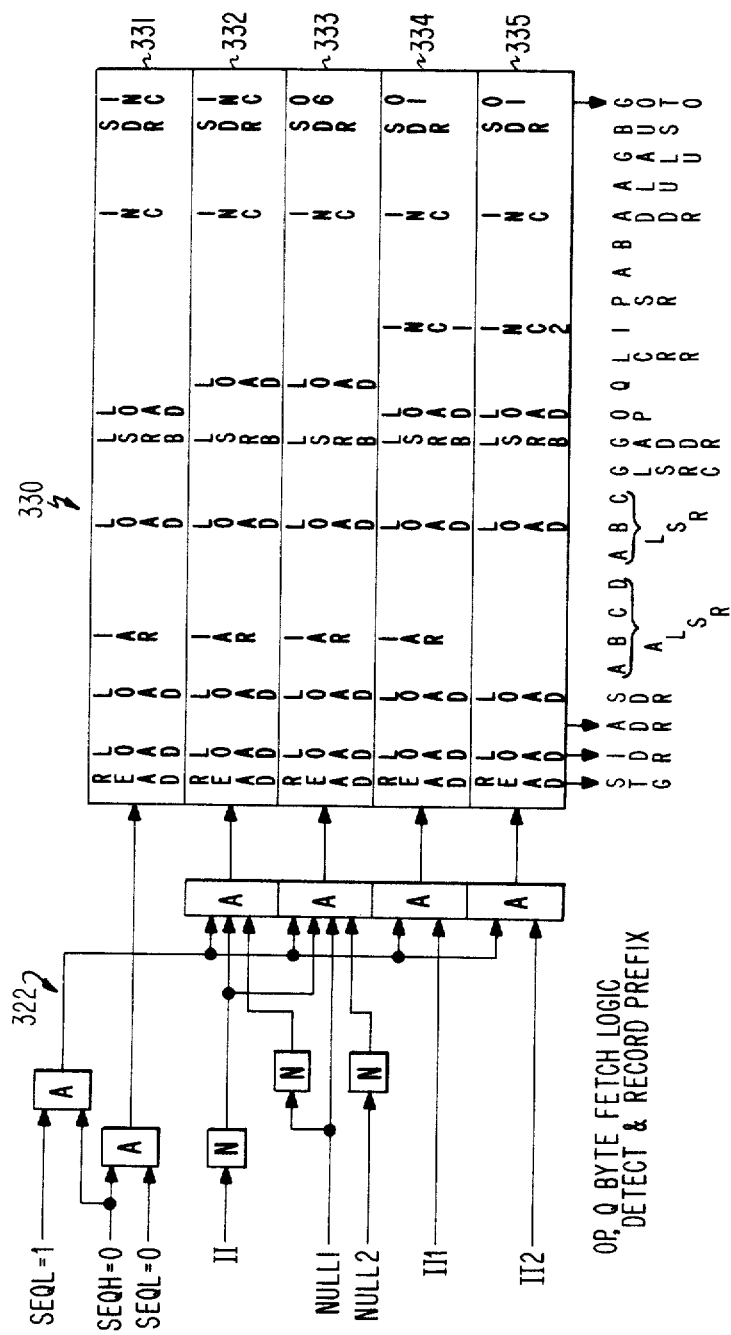

FIG. 4 shows logic 322 for detecting and decoding instructions and prefixes in the instruction stream. For current state SEQH=0, SEQL=0, ROS word 331 transfers the memory contents (SDR=LOAD) pointed to by IAR (ALSRB=IAR) to OP register 251 (BUS=SDR, OP=LOAD). The next state is SEQH=0, SEQL=1 because GOTO=INC.

The next four ROS words 332-335 require state SEQL=1. (SEQH=0 will be assumed until specified differently.)

ROS words 334-335 detect and record prefix bytes in the instruction stream. When III indicates the occurrence of a first-operand prefix byte in the instruction stream during state SEQL=1, the output control lines I for word 334 specify signal INC1, to increment counter 254. Word 335 similarly outputs INC2 to increment counter 255 when signal II2 detects a second-operand prefix byte. Note that the next state of both words is GOTO=01 (i.e., SEQH=0, SEQL=1), so that these two words repeat until the next byte is not a prefix byte. At that point, counters 254 and 255 contain the respective numbers of first and second prefix bytes encountered. Control then returns to words 332-333.

Words 332-333 load the OP and Q instruction bytes into the OP and Q registers 251 and 252. These words are prevented from acting on prefix bytes because the inverse (NOT) of the II signal is ANDed into their address lines. If the instruction has no first operand (NULL1) outputs GOTO=06 from word 333 transfer to ROS word 339, FIG. 5; otherwise (NOT NULL1), outputs GOTO=INC (i.e., next state is 02) from word 332 transfer to ROS word 336.

Figure 5:
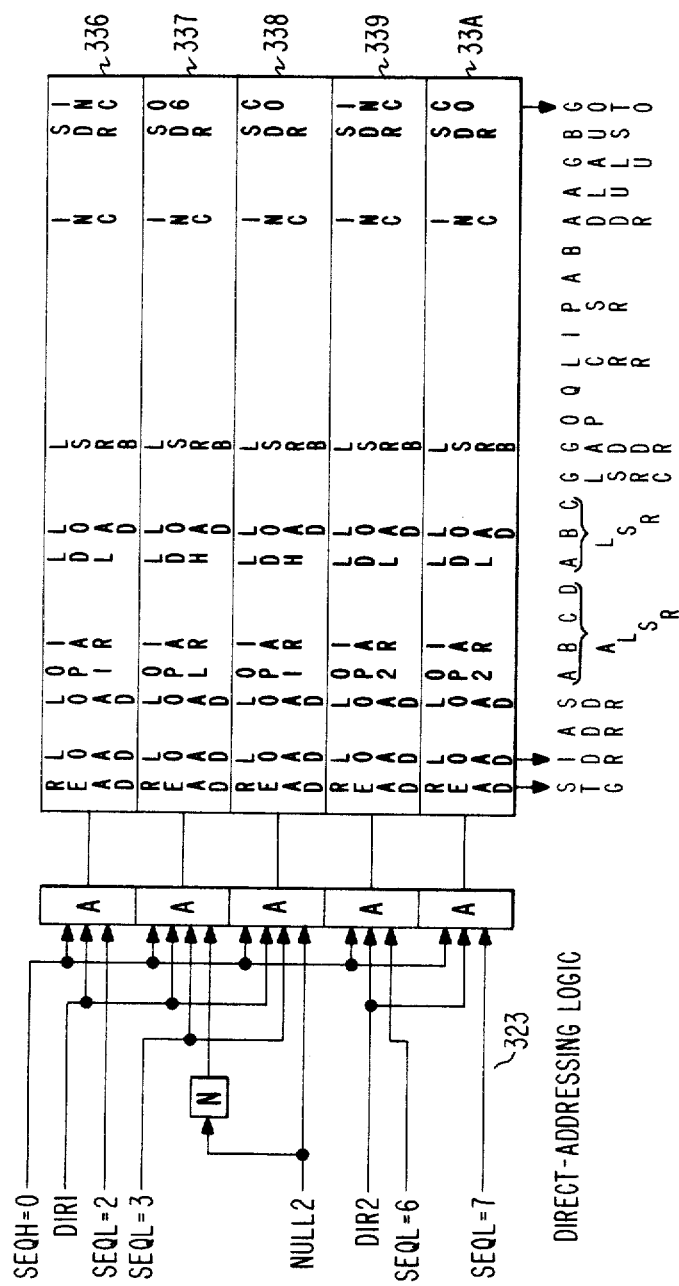

FIG. 5 shows operand-addressing control logic 323 for fetching operand addresses in the conventional direct-addressing mode. ROS words 336-338 are addressed only when DIR1 is active, indicating that the first operand is in the direct mode. Word 336 is always addressed in state SEQL=2. The choice between words 337 and 338 during state SEQL=3 depends upon whether or not there is a second operand, i.e., NULL2. A null second operand transfers directly to state GOTO=CO, but the presence of another operand transfers to GOTO=06. If the second operand is also direct-mode, words 339-33A fetch its two-byte address from the instruction stream to OP2 register 227 during states SEQL=6 and SEQL=7. The next state after word 33A is always GOTO=CO (FIG. 7 or 8).

Figure 6:
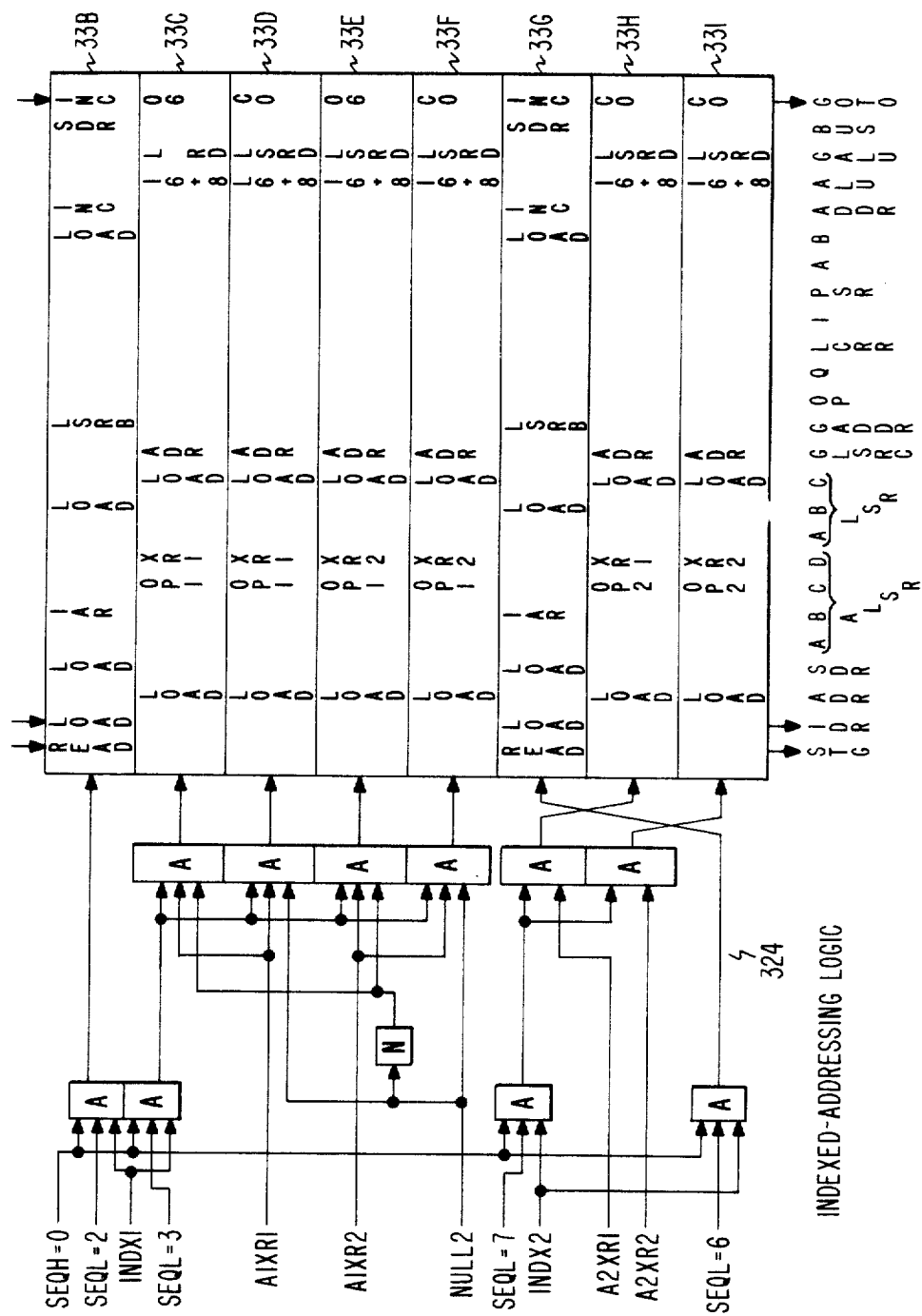

FIG. 6 shows operand-addressing control logic 324 for fetching conventional indexed-mode operand addresses. If the first operand is indexed (INDX1), word 33B is addressed during state SEQL=2. If the XR1 index register 224 is to be used (A1XR1), word 33C or 33D is addressed during SEQL=3, depending upon whether or not a second operand is present (NULL2) in the instruction. If XR2 register 225 is to be used (A1XR2) in calculating the address, word 33E or 33F is accessed, depending upon NULL2. These two words, like 33C-33D, are alike except that the presence of a second operand causes next-state logic 310 to go to 06 as the next state; otherwise, CO is the next state. If the second operand is in the direct mode, DIR2 will access words 339-33A, as described in connection with FIG. 5. But, if the second operand is indexed, word 33G transfers to state GOTO=06 at SEQL=6. Then, INDX2 addresses word 33H or 33I during SEQL=7, depending upon which index register is to be used (A2XR1, A2XR2). These three words first load the next instruction-stream byte from SDR register 241 to B register 233 via bus 210, then add it to either XR1 register 224 or XR2 register 225 via ALSR port D into GALU input 231. The resulting indexed address is placed into OP2 register 227 via ADR register 234, bus 210, GLSRC multiplexer 221 and LSR port C, ALSR being switched so that ALSRC connects port C to OP2 for writing.

FIG. 7 shows indirect-addressing control logic 325 and ROS words 33J-33N which employ the stored prefix-byte occurrences to perform indexed-indirect operand addressing according to the invention. For all of these ROS words, the high-order digit of the current state is SEQH=C.

Words 33J-33K perform an indirection during states SEQL=0 and SEQL=1 when counter 254 is nonzero, i.e., when I1≠0 is active. Word 33J first transfers the byte addressed by the contents of OP1 register 226 through SDR 241 to bus 210, then through the high-order side of port A to the high-order byte of ARR 223. Word 33J also increments the contents of memory address register ADDR 242. Word 33K then transfers the following memory byte via the low-order side of port A to the low-order byte of ARR 223 for temporary storage.

Words 33L-33M perform an indirection in the same manner for the second operand address when I2≠0 indicates that counter 255 is nonzero.

Word 33N next fetches a displacement byte from the instruction stream during state SEQL=2 when either counter is nonzero. The contents of IAR 222 pass through port B to ADDR 242. The memory byte thus addressed is passed from SDR 241 via bus 210 to B register 233. Meanwhile, IAR 222 is incremented by loading incrementer register IDR 244, and reloading IAR therefrom via port B.

Words 33P-33Q index an indirect operand address by the amount of the displacement byte, during state SEQL=3. If counter 254 is nonzero (I1≠0 is active), word 33P is addressed. ALU 230 adds the displacement byte in register B 233 to the two-byte contents of ARR 223, connected via port D to multiplexer 231. The sum is loaded into ADR 234, thence via port C of multiplexer 221 into OP1 226. Therefore, OP1 now contains the indexed indirect address of the first operand in place of the former address contained in OP1. That is, the new address merely substitutes for the old in the same register. Meanwhile, counter 254 is decremented by the DEC1 signal on the I control lines. Word 33Q is addressed when counter 255 is nonzero (I2≠0), after counter 254 has reached zero (NOT I1≠0). It acts in the same manner as word 33P, but with respect to C2 counter 255 and OP2 register 227. Both words 33P and 33Q specify a next state GOTO=C0. Therefore, if either of the counters is still nonzero, words 33J-33Q are re-executed, and the cycle repeats itself.

When both of the counters 254 and 255 have reached zero, the I≠0 signal becomes inactive, and a current state of C0 (i.e., SEQH=C, SEQL=0) causes execution control logic 326, FIG. 8, to address microcode words for executing the particular instruction specified by the OP and Q bytes. These words are also addressed after words 338, 33A, 33D, 33F, 33H or 33I if the initial contents of both counters were zero; that is, if no prefix bytes had been encountered for the current instruction.

In the present example, words 33R-33T carry out an instruction for loading a register identified by the contents of the Q byte. Word 33R addresses memory with the contents of OP1 register 226, via ALSR read port B, and also increments and restores these contents via IDR 244 and LSR write-port B. Meanwhile, the low-order byte of the operand is fetched from SDR 241 via bus 210 to the LO side of the A port of bank 220, thence to the low byte of that register 222-227 specified by the Q byte (since ALSRA=Q). Word 33T then similarly fetches the following memory byte via the HI side of port A to the high-order byte of the same register. After execution of the instruction, the next sequencer state becomes GOTO=00 for fetching the next instruction.

For ease of exposition in FIGS. 3-8, each separate function occupies a separately addressed control word 33L-33T. Further routine (although tedious) design effort could decrease the overall size and increase the speed of control unit 300 with the inherent "OR" characteristics of ROS 330. For example, the logics 323 and 325 could be combined to address multiple ROS words simultaneously, since the fetching of a direct-mode address and the fetching of an indirect address are performed in essentially the same way. The same is true of the calculation of an indexed-mode address and an indexed-indirect address, allowing logics 324 and 325 to be reduced.

Figure 9:
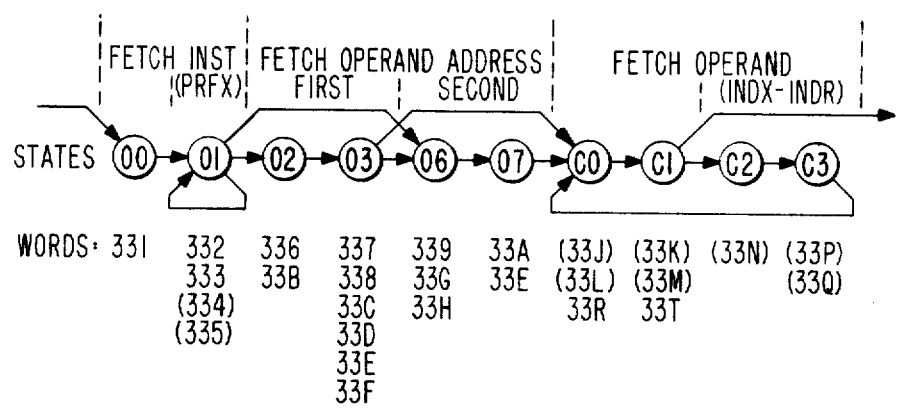
FIG. 9 summarizes the sequence of states assumed by the control unit of FIGS. 3-8 in carrying out the invention.

FIG. 9 summarizes the operation of control unit 300 in terms of the states of next-state logic 310 and the specific words of ROS 330 which occur during the execution of a single instruction in the instruction stream. The circles represent the specific states whose SEQH, SEQL values are written inside; possible successors to each state are indicated by arrows. The possible ROS words 33L∝33T which can be addressed during each state are listed below that state. Only one of the words in each list can be addressed during each instance of the corresponding state. Parenthesized words are those directly involved in carrying out the present invention. In practice, other states are interspersed with these states for purposes not related to the present invention. Briefly, states 00 and 01 fetch the OP byte of an instruction or a prefix byte. Words 334-335 detect and record prefix bytes during state 01. States 02, 03, 06, and 07 fetch operand addresses as specified by the instruction itself, the first two states for the first operand, the others for the second operand. Words 336-33A control direct-mode addressing, while 33B-33F control indexed-mode addressing. States C0-C3 fetch the actual operands from their addresses. If no prefix bytes had preceded the instruction, states C0-C1 use words 33R-33T, then exit to the next instruction. But the occurrence of prefix bytes causes states C0-C3 to access words 33J-33N, which fetch indirect addresses from the operand addresses, fetch displacement bytes from the instruction stream, and combine them to form new operand addresses. The C0-C3 cycle is repeated for each occurrence of a prefix byte. Thereafter, the C0-C1 states execute the instruction as above, using words 33R-33T.

I claim as my invention:

1. A method for addressing an instruction operand in a data processor having an addressable memory, comprising:
   (a) fetching a token in an instruction stream;
   (b) if said token represents a predetermined prefix code,
   (1) incrementing a count, and (2) repeating step (a);

(c) if said token represents an instruction, determining an operand address at least partly specified by said instruction;

(d) if said count is nonzero,
  (1) fetching a memory word at said operand address,
  (2) fetching a suffix value,
  (3) modifying said memory word in accordance with said suffix value so as to substitute a further address for said operand address,
  (4) decrementing said count, and
  (5) repeating step (d);

(e) fetching an operand for said instruction in accordance with said operand address.

2. A method according to claim 1 wherein:
said token representing said prefix code precedes said instruction in said stream.

3. A method according to claim 1 wherein:
said suffix value follows said instruction in said stream.

4. A method according to claim 1, wherein step (d)(3) comprises:
adding said suffix value as an index to said memory word.

5. A method according to claim 1, further comprising:
  (f) duplicating steps (b) through (e) for at least one additional prefix code, count, operand address, memory word, suffix value, further address, and operand, respectively.

6. A method for addressing an instruction operand in a data processor having an addressable memory, comprising:
  (a) fetching a token in an instruction stream;
  (b) if said token represents a predetermined prefix code, recording its occurrence;
  (c) if said token represents an instruction, fetching an operand word in said memory at an address at least partially specified by said instruction;
  (d) in response to said recorded occurrence, fetching a further word in said memory at least partially specified by said operand word and substituting said further word for said operand word; and
  (e) executing an operation specified by said instruction upon said operand word.

7. A method according to claim 6, further comprising:
  (f) in response to said recorded occurrence, fetching a modifier; and
  (g) modifying said operand word in accordance with said modifier prior to fetching said further word from said memory.

8. A method according to claim 7, wherein:
said modifier is located in said instruction stream.

9. A method according to claim 8, wherein:
said modifier follows said instruction in said instruction stream.

10. A method according to claim 6 further comprising:
  (h) repeating steps (b) and (d) in response to successive occurrences of said prefix code associated with said instruction.

11. A method according to claim 10 wherein:
said prefix codes precede said instruction in said instruction stream.

12. A method according to claim 6, further comprising:
duplicating steps (b), (c), and (d) for at least one additional prefix code, operand word, and further word.

13. A data processor having an addressable storage, said processor comprising:
decoding means for decoding an instruction in an instruction stream, said decoding means including means for detecting the occurrence of a predetermined prefix code in said instruction stream;
prefix register means for recording the occurrence of said prefix code;
operand addressing control means responsive to said decoding means for accessing a first word from an address in said memory at least partly determined by said instruction;
indirect addressing control means responsive to said prefix register means for accessing a further word from an address in said memory at least partly determined by said first word;
execution means for performing said instruction upon an operand at an address in said memory at least partly determined by said further word.

14. A data processor according to claim 13, wherein:
said indirect addressing control means includes means for modifying said first word before accessing said further word.

15. A data processor according to claim 14, wherein:
said indirect addressing control means includes means for fetching a suffix value from instruction stream for modifying said first word.

16. A data processor according to claim 13, wherein:
said prefix register means is a coutner for recording the number of occurences of said prefix code.

17. A data processor in accordand with claim 16, wherein:
said indirect addressing addressing control means includes means for accessing a number of further words, each at an address in said memory at least partly determined by a preceding one of said further words.

18. A data processor according to claim 13, wherein:
said decoding means includes means for detecting the respective occurences of a plurality of different prefix codes in said instruction stream; and
said prefix register means includes means for recording separately the respective occurrences of each of said different prefix codes.

19. A data processor according to claim 18, wherein:
said operand addressing control means includes means for accessing a plurality of first words from addresses in said memory at least partly determined by said instruction;
said indirect addressing control means includes means for accessing a plurality of further words from addresses in said memory at least partly determined by respective ones of said first words; and
said execution means includes means for performing said instruction upon a plurality of operands at least partly determined by respective ones of said further words.

* * * * *